United States Patent Office 3,488,740
Patented Jan. 6, 1970

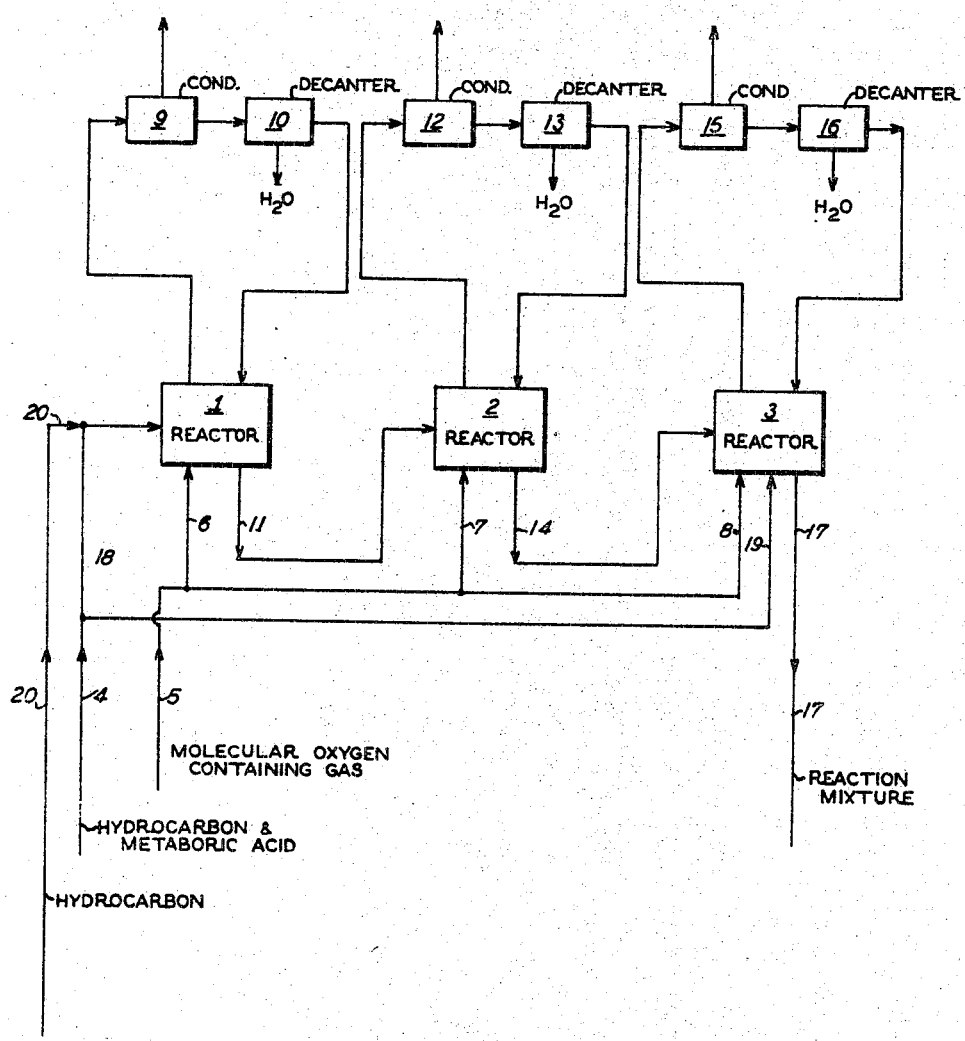

3,488,740
METHOD FOR OXIDIZING HYDROCARBONS IN THE PRESENCE OF BORON ADJUVANTS
Joseph L. Russell, Ridgewood, N.J., assignor to Halcon International, Inc., a corporation of Delaware
Filed Nov. 23, 1966, Ser. No. 596,614
Int. Cl. C07c 27/12
U.S. Cl. 260—617
5 Claims

ABSTRACT OF THE DISCLOSURE

In the continuous oxidation of hydrocarbons in the presence of boron adjuvants in a plurality of oxidation stages connected in series, improved operation is obtained by controlling the amount of boron adjuvant such that the effluent from the first oxidation stage contains at least one gram atom of boron per three gram moles of total hydrocarbon alcohol in said effluent but does not contain enough boron adjuvant to result in formation of a separate solids phase. Additional boron adjuvant is added to at least one other of the oxidation stages and the total amount of boron adjuvant employed in the oxidation is at least sufficient to provide one gram atom of boron per three gram moles of total hydrocarbon alcohol in the effluent from the last of the oxidation stages.

---

The molecular oxygen oxidation of hydrocarbons such as cyclohexane is an important commercial subject. Methods have previously been known for carrying out this reaction both in continuous and batch-type fashion in order to produce a reaction mixture containing important chemicals such as cyclohexanol and cyclohexanone. In high volume commercial installations, it is desirable for reasons of process economy and product quality that the process be carried out in a continuous fashion.

Recently, important advances have been made in the oxidation of saturated hydrocarbons with molecular oxygen. These important advances involve the provision of boron compounds, such as metaboric acid as adjuvants during the molecular oxygen oxidation. The provision of such adjuvants has markedly improved the reaction selectivity to the corresponding alcohol.

Particularly advantageous embodiments of such hydrocarbon oxidation processes employing boron adjuvants are disclosed in U.S. Patent No. 3,243,449 and in U.S. patent application, Ser. No. 549,607 filed May 12, 1966.

In hydrocarbon oxidation processes of the type hereinabove discussed, it is customary that the hydrocarbon and the totality of the boron adjuvant to be employed in the reaction be premixed before oxidation is begun or that the hydrocarbon and the totality of the boron adjuvant be premixed substantially concurrently with the inception of the reaction. In this manner, it has been thought, that the maximum selectivity of the conversion of the hydrocarbon to the desired ketone and alcohol products would be obtained with a minimum of undesired by-products. However commercial operations with such a system have proved troublesome since, at least at the inception of the oxidation, a separate solids phase is present which oftentimes deposits out in the equipment, restricting passage of fluid through conduits, pipe, valves and other equipment and, at the same time, reducing the amount of boron adjuvant available in subsequent oxidation stages.

For long, it has been felt that these mechanical problems have been an essential price to pay for the greatly improved selectivity achieved by the use of boron adjuvants (see U.S. Patent 3,243,449). However, this invention affords a method whereby it is possible to fully achieve the advantage in selectivity arising from the use of the boron adjuvants and, at the same time, reducing and even eliminating the mechanical problems that have heretofore been felt to be an essential concomitant of the use of boron adjuvants in continuous hydrocarbon oxidation processes.

In accordance with this invention, the hydrocarbon is continuously oxidized in the liquid phase in the presence of a boron adjuvant in a plurality of separate oxidation stages connected in series. The oxidizing agent is, of course, molecular oxygen. Boron adjuvant is added to the first oxidation stage in an amount such that the amount of boron present in the effluent from this first oxidation stage is at least one gram atom of boron per three gram moles of total hydrocarbon alcohol in said effluent, but less than an amount sufficient to result in the formation of a separate solids phase in said effluent. Additional boron adjuvant is added to at least one other of the oxidation stages and the total amount of boron adjuvant employed is sufficient to supply at least one gram atom of boron per three gram moles of total hydrocarbon alcohol in the effluent from the last of the oxidation stages but not more than about 1.5 gram atoms of boron per gram mole of total hydrocarbon alcohol in said last stage effluent.

As used herein and in the appended claims the phrase "total hydrocarbon alcohol" is a term of art. Hydrocarbon alcohol can be present in the reactor effluent in a variety of forms, either free or combined. Hydrocarbon alcohol can be formed during the oxidation or it can be present in the feed to the reactor because of incomplete separation in subsequent recovery stages between unconverted hydrocarbon, which is recycled to the oxidation, and hydrocarbon alcohol product. The term "total hydrocarbon alcohol" is intended to encompass all such alcohol whether free or combined. By "free" is meant hydrocarbon alcohol as such as in the form of hydroperoxide, e.g., cyclohexanol and/or cyclohexyl hydroperoxide. By "combined" is meant the totality of hydrocarbon alcohol combined with boron to form borate esters which can be mono-esters, di-esters and/or tri-esters; peroxyborates are also included.

Surprisingly, it has been found that reducing the amount of boron adjuvant in the first oxidation stage to a level below the solubility limit of the adjuvant in the effluent from the 1st stage but maintaining the amount of the boron adjuvant in this effluent so that it is at least one gram atom of boron per three gram moles of total hydrocarbon alcohol does not adversely affect selectivity. Indeed, selectivity in the process of this invention is unaffected by the reduction in the amount of boron adjuvant added and plant operation is very greatly simplified.

The hydrocarbon oxidation is carried out in a plurality of reactors connected in series. In extremely large commercial plants, trains of reactors connected in parallel may be employed with the reactors of each train connected in series. Series-parallel reactor trains are also possible but are more difficult to control on a commercial scale. A hydrocarbon in liquid phase together with a carefully controlled amount of boron adjuvant is charged to the first reactor of the reactor train. In the reactor, the hydrocarbon and adjuvant are contacted with molecular oxygen-containing gas at reaction conditions until the desired conversion is obtained. The reaction products are continuously withdrawn from the first reactor and fed to the second reactor wherein the reaction mixture from the first reactor is contacted with additional molecular oxygen-containing gas and additional oxidation occurs. The reaction product from the second reactor is fed to the third reactor where additional oxygen is supplied and additional oxidation occurs. Similar processing can be conducted in a fourth, fifth and in as many subsequent reactors as desired in the manner described hereinabove. As few as two reactors or as many as ten or even more reactors connected in series can be employed, with three to four reactors in series being preferred.

Usually from 5 to 15% of the hydrocarbon is converted per pass across the entire reactor train although higher or lower conversions can be obtained. Conversion of hydrocarbon across the first reactor is usually at least 0.3% and can be as high as 3% or even higher. Similar conversions can be obtained across subsequent reactors. Desirably the oxidation is so conducted that the bulk of the desired conversion (or oxidation) is conducted in a milieu containing at least 1.5 mol percent of oxidized hydrocarbon in the manner disclosed and claimed in application Ser. No. 549,607 filed on May 12, 1966.

As disclosed in this application, the percentage, A, of the total oxygen which reacts with hydrocarbon in the reaction system is reacted with the hydrocarbon in an environment containing 1.5 mol percent of oxidized hydrocarbon, where A is given by the equation, $$A = \frac{x - 1.5}{x} (100)$$

and $x$ is the overall conversion of hydrocarbon across the reaction system. Accordingly it is desirable that about 1.5% of the hydrocarbon be oxidized in the first reactor and it is preferred that about 2% conversion be obtained across the first reactor.

In the oxidation reaction, a hydrocarbon in liquid phase together with a boron compound, such as meta boric acid, is charged to a reactor and contacted with a molecular oxygen-containing gas at reaction conditions until the desired conversion is obtained. The normal conversions per pass are as stated above. Typical oxidation temperatures are in the range from about 150° C. to about 200° C. Typical pressures are from about atmospheric to 1000 p.s.i.g., depending, for example, on the hydrocarbon, preferably 100 p.s.i.g. to about 200 p.s.i.g. The preferred boron compounds employed in such oxidations are boric acids (ortho and meta boric acids) boric acid esters (such as the ester of meta boric acid with the mono-alcohol derivative of the hydrocarbon being oxidized, e.g. cyclododecanyl meta borate when cyclododecane is the hydrocarbon being oxidized) and boric acid anhydrides (e.g., $B_2O_3$ and $B_4O_5$). Mixtures of these boron adjuvant compounds can also be employed. Meta boric acid is an especially preferred adjuvant.

Suitable hydrocarbon feeds to the oxidation reaction are those saturated hydrocarbons having from 4 to and including 20 carbon atoms per molecule. This includes mixtures of such hydrocarbons. Thus, saturated aliphatic and alicyclic hydrocarbons such as, for example, cyclohexane, methyl cyclohexane, cycloheptane, cyclooctane, dimethyl cyclohexanes, n-pentane, n-hexane, methyl pentanes, methyl butane, cyclododecane, eicosane, $C_{12}$ to $C_{14}$, petroleum naphtha, $C_{14}$ to $C_{18}$, petroleum naphthas, and the like. In the context of this application it is not necessary that the feed be entirely free of unsaturated materials, such as cyclohexene, so long as the feed consists essentially of saturated hydrocarbons, i.e., more than about 95% (mol basis) saturated. Similarly, small amounts of sulfur and nitrogen containing compounds, present as impurities, can also be present in the hydrocarbon feed.

At the present time the most widely practiced embodiment of the hydrocarbon oxidation reaction with which this application is concerned is the oxidation of cyclohexane to a mixture of cyclohexanol and cyclohexanone; hence, the process of the invention will be described using cyclohexane oxidation as an illustrative embodiment, it being understood that the invention is not limited to this feed but is broadly applicable to any of the feeds referred to hereinabove.

During the oxidation of the hydrocarbon (cyclohexane or any of the other hydrocarbons referred to hereinabove) the majority of the hydrocarbon is converted to a borate ester of the corresponding monofunctional alcohol and to ketone. It is believed that an alcohol is formed during the oxidation which then esterifys with the boron adjuvant compound to form a borate ester, e.g., cyclohexyl borate. An alternate route could be for cyclohexyl hydroperoxide to react with the boron compound to give a peroxyborate which then reacts to form cyclohexyl borate. Thus, when cyclohexane is oxidized, the reactor effluent contains, primarily unreacted cyclohexane, cyclohexyl borate, cyclohexanone and cyclohexyl peroxy borate or cyclohexyl hydroperoxide.

Such mixtures of products and unreacted feedstock are hereinafter referred to in this specification as borate ester-containing hydrocarbon oxidation mixtures.

The borate ester-containing hydrocarbon oxidation mixture is then hydrolyzed, thereby converting the borate ester to the free alcohol and ortho boric acid. The main oxygenated products are recovered as product and the boric acid is recovered for recycle to the hydrocarbon oxidation. Recovered, unreacted cyclohexane can be recycled to the first oxidation stage together with fresh cyclohexane feed. This recycled cyclohexane can contain a small quantity of cyclohexanol due to incomplete separation. The amount of boron adjuvant fed to the first reactor in accordance with this invention is a function of the conversion obtained therein and the amount of cyclohexanol, either free or combined in the feed to the first reactor. The adjuvant, preferably one of the boric acids, is only slightly soluble, if at all, in saturated hydrocarbons. However, boron acids are substantially more soluble in oxygenated hydrocarbons, such as cyclohexanol and cyclohexanone. Thus, when little hydrocarbon has been converted, little boron adjuvant is in solution. As more and more alcohol and ketone are formed, more and more of the boron adjuvant becomes soluble. Also affecting boron adjuvant solubility is the extent to which the boron adjuvant esterifies with the alcohol. Boron acids can react with alcohols to form a mono-alcohol borate; they can also, even in the case of meta boric acid, form dialcohol and trialcohol esters. Thus, it becomes an extremely complex problem to define and delimit the solubility of a boron adjuvant in a hydrocarbon oxidation product since this will depend upon reaction conditions and upon conversion.

In the process of our invention, we have found that, to preserve reaction selectivity, it is necessary to employ sufficient boron adjuvant so that the effluent from the first oxidation stage contains at least one gram atom of boron per three gram moles of total hydrocarbon alcohol, desirably at least about 1.2 gram atoms of boron per three gram mols of total hydrocarbon alcohol and preferably at least about 1.3 gram atoms of boron per three gram mol of total hydrocarbon alcohol.

It is also necessary that the effluent from the last oxidation stage contain at least one gram atom of boron per three gram moles of total hydrocarbon alcohol in order to preserve reaction selectivity in oxidation stages subsequent to the first stage. Desirably, at least 1.2 gram atoms of boron per gram mol of total hydrocarbon alcohol are present and preferably at least 1.3 gram atoms of boron per three gram mol of total hydrocarbon alcohol are present.

Thus, it is also essential in the practice of this invention that additional boron adjuvant be added to oxidation stages subsequent to the first oxidation stage and preferably though not essentially to all oxidation stages subsequent to the first stage.

To achieve the full advantage of this invention the amount of boron adjuvant added is below an amount sufficient to cause a separate solids phase in the reactor effluents of the several oxidation stages to be formed.

For the reasons given above it is extremely difficult to determine the solubility limit of boron adjuvants in borate ester-containing hydrocarbon oxidation mixtures. In the case, for example, of cyclohexane oxidation it has been found that the solubility limit of boron, determined as meta-boric acid, in cyclohexane containing 2.5% by weight of cyclohexane oxidation products (including cyclohexanone and cyclohexanol) is approximately 0.7 wt. percent at 165° C. Accordingly it is desirable to avoid boron adjuvant levels in excess of 0.8 wt. percent as meta-boric acid in the effluent from the first oxidation stage and it is preferred to avoid boron adjuvant levels in excess of 0.7% as meta-boric acid in the effluent from the first oxidation stage. The effluents from subsequent oxidation stages can contain greater quantities of boron adjuvant without the formation of a separate solids phase since the effluents from such subsequent stages will contain greater quantities of oxygenated hydrocarbons and boron adjuvants are more soluble as the concentration of oxygenated hydrocarbons increases. Even within the preferred range, it is possible that some entrained boron adjuvant would be present in the oxidation stage effluents because of insufficient time within the oxidation stage to permit the boron adjuvant to dissolve and/or chemically combine.

The process of this invention will be more fully explained in conjunction with the attached drawing, FIGURE 1, which is a schematic representation of one embodiment thereof. For purposes of illustration, but without intending any limitation upon the scope of this invention, the feed to the process as illustrated in FIGURE 1 is assumed to be cyclohexane and the boron adjuvant is assumed to be meta boric acid. Similarly, for simplicity the reaction system is illustrated as comprising three oxidation stages connected in series.

Referring to FIGURE 1, there are provided on a continuous oxidation system three separate oxidation reactors numbered respectively, reactors 1, 2, and 3. Each of the reactors is equipped with a condenser and a decanter enabling the condensation of vapors which are withdrawn from each reactor, a decantation of the condensed vapors, and return to separated hydrocarbon to the reaction zone.

In the continuous oxidation, a slurry of hydrocarbon and finely divided solid boron adjuvant, preferably metaboric acid, is fed to reactor 1 through conduits 4 and 18 and to reactor 3 through conduits 4 and 19. Additional hydrocarbon, if needed, is supplied to reactor 1 through conduit 20.

Molecular oxygen-containing gas is fed to the system through conduit 5 and to each individual reactor through conduits 6, 7, and 8 each communicating with conduit 5. Vapors removed from reactor 1 are condensed in condenser 9 and decanted in vessel 10. The lower water layer is discarded and the upper hydrocarbon phase is returned to reactor 1. The reaction in each of the reactors is preferably carried out at a temperature in the range of about 100–300° C., preferably 140 to 180° C. and at elevated pressure such as 10–500 p.s.i.g. sufficient to maintain liquid phase in the reactor while still permitting hydrocarbon boil-up and removal of hydrocarbon and water vapors. Heat is provided as needed to insure hydrocarbon boil-up and low system water vapor partial pressure.

As the critical aspect of the present invention, the amount of boron adjuvant fed to reactor 1 is controlled so that the effluent from reactor 1 contains at least one gram atom of boron per three gram moles of total hydrocarbon alcohol and preferably at least about 1.3 gram atoms of boron per three gram moles of total hydrocarbon alcohol, but is less than an amount sufficient to cause a separate solids phase to be present in the effluent from reactor 1. The amount of boron adjuvant added to reactor 1 is readily metered in known manner to provide an amount of boron within the above ranges. The amount of hydrocarbon alcohol in the reactor effluent is readily controlled by adjusting the amount of molecular oxygen fed to the reactor, or by adjusting reactor residence time or by adjusting reactor temperature or by a combination of any or all of the foregoing methods.

A portion of the reaction mixture from reactor 1 is continuously withdrawn and led through line 11 to reactor 2. In this reactor, the oxidation is continued with vapors being removed, condensed in condenser 12, separated in decanter 13, with hydrocarbon being returned to the reactor 2.

A portion of the reaction mixture from reactor 2 is continuously removed through conduit 14 and passed to reactor 3 wherein additional boron adjuvant is added and additional hydrocarbon oxidation occurs. The amount of additional boron adjuvant added to reactor 3 is sufficient to supply at least one gram atoms of boron per three gram mols of total hydrocarbon alcohol in the effluent from reactor 3, the last reactor in the reactor train. Condenser 15 and decanter 16 are employed in conjunction with reactor 3. The final reaction mixture is removed from reactor 3 by means of line 16. This reaction mixture comprises mainly borate esters of the alkanol formed by the hydrocarbon oxidation in admixture with unreacted hydrocarbon. This mixture may be worked up by conventional methods such as hydrolysis to recover the valuable components of the mixture.

The following examples are presented to further illustrate this invention but are not intended as limiting the scope thereof. Unless otherwise stated, all parts and percents in the following examples are by weight.

EXMAPLE 1

19.2 pounds/hr. of cyclohexane and 0.11 pound per hours of metaboric acid are preheated to 165° C. and charged to the first reactor in a reactor train comprising three autoclaves containing 1.5 gallons of liquid each. The autoclaves are connected in series and are equipped with associated heat exchangers and pumps. An additional 0.27 pound per hour of metaboric acid in the form of a slurry in cyclohexane containing 2.3% metaboric acid are fed to the second reactor. By adjustments to oxygen rate and reactor temperature, the conversion across each reactor is adjusted to the level indicated in Table 1. A gas containing 20.8 mol percent oxygen with the balance being essentially nitrogen is fed to each of the 3 reactors at the rates specified in Table 1 below.

TABLE 1

| Reactor No. | Temperature of reactor, °C. | Rate of oxygen containing gas, s.c.f./min.[1] | Percent hydrocarbon converted |
|---|---|---|---|
| 1 | 165 | 0.22 | 3.5 |
| 2 | 165 | 0.26 | 5.1 |
| 3 | 165 | 0.26 | 7.8 |

[1] S.c.f.=Standard cubic foot of gas, gas volume measured at 70° F. and one atmosphere total pressure.

Overall conversion of cyclohexane is 7.8% and selectivity to cyclohexanol and cyclohexanone in the effluent from the third reactor (after hydrolysis of the borate esters in the effluent to recover the cyclohexanol contained therein) is 85%. The gram atoms of boron per gram mole of total cyclohexanol in the effluent from the first reactor is 1.10 and the overall gram atoms of boron per gram mole of cyclohexanol in the effluent from the third reactor is 1.15.

Control A

Example I is repeated employing the same total amount of metaboric acid except that all of the boric acid is charged to the first reactor and none to the second or third reactor. Substantially the same overall selectivity and conversion is obtained as in Example I; however, substantial amounts of solids: consisting essentially of metaboric acid are present in the effluents from the first, second and third reactors.

EXAMPLE II

Example I is repeated employing cyclododecane instead of cyclohexane as the hydrocarbon. Similar results are obtained.

Control B

Example II is repeated employing the same total amount of metaboric acid except that all of the boric acid is charged to the first reactor and none to the other reactors. Results are substantially identical to those of Example II; however, unlike Example II, substantial amounts of solid metaboric acid are present in the effluents from the first, second and third reactors.

EXAMPLE III

Example I is repeated employing a $C_{12}$–$C_{14}$ paraffinic petroleum naphtha instead of cyclohexane as the hydrocarbon. Similar results are obtained.

The foregoing description illustrates the methods of this invention whereby the advantages thereof are obtained. It will be understood that modifications and variations thereof may be effected by those skilled in the art without departing from the spirit of our invention. Accordingly it is intended that all matter contained in the above description shall be interpreted as illustrative and not in a limiting sense.

What is claimed is:

1. A continuous process for the molecular oxygen oxidation of a saturated aliphatic or alicyclic hydrocarbon which comprises oxidizing the hydrocarbon with molecular oxygen in the liquid phase at a temperature within the range of about 100–300° C. and at a pressure within the range from atmospheric to 1000 p.s.i.g. in a plurality of separate oxidation stages, connected in series, in the presence of a boron adjuvant selected from the group consisting of boric acids, boric acid esters and boric acid anhydrides, wherein the amount of boron adjuvant present in the effluent from the first oxidation stage is at least one gram atom of boron per three gram moles of total hydrocarbon alcohol in said effluent but less than an amount sufficient to result in the formation of a separate solids phase in said effluent and wherein additional boron adjuvant is added to at least one other of the oxidation stages, the total amount of boron adjuvant employed in the oxidation being sufficient to provide at least one gram atom of boron per three gram moles of total hydrocarbon alcohol in the effluent from the last of the oxidation stages.

2. A process in accordance with claim 1 wherein the hydrocarbon is cyclohexane.

3. A process in accordance with claim 1 wherein the hydrocarbon is cyclododecane.

4. A process in accordance with claim 2 wherein the amount of boron adjuvant present in the effluent from the first oxidation stage is at least one gram atom of boron per three gram moles of cyclohexanol but not in excess of 1.5 gram atoms of boron per gram mole of cyclohexanol in said effluent.

5. A process in accordance with claim 1 wherein the hydrocarbon is a paraffinic petroleum naphtha containing more than 12 and not more than 20 carbon atoms per molecule.

References Cited

UNITED STATES PATENTS

| | | | |
|---|---|---|---|
| 1,947,989 | 2/1934 | Hellthaler et al. | 260—586 |
| 3,317,581 | 5/1967 | Becker | 260—617 |

LEON ZITVER, Primary Examiner

M. W. GLYNN, Assistant Examiner

U.S. Cl. X.R.

260—586, 631, 639